United States Patent Office 2,820,061
Patented Jan. 14, 1958

2,820,061

PREPARATION OF ORGANIC THIOLS

Hillis O. Folkins, Crystal Lake, Elmer L. Miller, Cary, and Adolph Kempf, Crystal Lake, Ill., assignors to The Pure Oil Company, Chicago, Ill., a corporation of Ohio No Drawing. Application July 28, 1954
Serial No. 446,398

12 Claims. (Cl. 260—609)

This invention relates to the production of organic thiols and is specifically directed to a method and a composite catalyst for increasing the efficiency of the reaction between a monohydric alcohol and hydrogen sulfide to produce said organic thiols. This application is a continuation-in-part of application Serial No. 377,668, filed August 31, 1953, now abandoned.

Mercaptans as a class of compounds may be produced from a variety of raw materials and by means of a plurality of processes. The more adaptable of these processes involves the addition of the sulhydryl radical to a suitable nucleus. Most commercial scale processes for the formation of relatively high molecular weight thiols involve the direct addition of hydrogen sulfide to olefinic hydrocarbons in the presence of suitable catalysts. However, the mechanism of the reaction precludes its use in the preparation of methanethiol.

Although it is one of the most classic methods, having been discovered by Sabatier, and entails as simple a mechanism as the reaction between hydrogen sulfide and olefinic hydrocarbons, the dehydration of alcohols by interreacting hydrogen sulfide therewith in the presence of a metallic oxide has never been commercially adapted to the production of thiols because of the indifferent results obtained when the process was practiced according to the prior art techniques. It has been found, however, that this reaction may be carried out efficiently and economically in the commercial production of organic thiols, especially methanethiol, by suitably modifying the techniques described in the prior art.

Earlier development work in the production of methanethiol employing methanol and hydrogen sulfide as reactants was concerned primarily with manipulative techniques for improving the efficiency of the reaction. For example, it was found that by carrying out the reaction in the presence of small amounts of water, the efficiency of the reaction was considerably enhanced. This discovery is disclosed and claimed in U. S. Patent 2,685,605. In addition, the use of critical amounts of hydrogen was also found to have a beneficial affect on the conversion. This improvement is disclosed and claimed in U. S. Patent 2,647,151. The catalysts employed in this work were the metallic oxides disclosed in the prior art. Earlier investigations of this reaction, such as that reported by Kramer and Reid, J. A. C. S., 43 (880), (1921), indicated that thoria was the most effective catalyst for carrying out the reaction. Subsequent work confirmed this and produced results which evidenced that thoria was about twice as effective as zirconia, the next best metallic oxide for carrying out the reaction employing the lower molecular weight alcohols. It has now been found that other compositions may be employed as catalysts for increasing the efficiency of the reaction between an alcohol and hydrogen sulfide to produce an organic thiol to the extent that the process has commercial value.

Accordingly it is an object of this invention to provide a contact or solid catalyst capable of producing high yields of organic thiols from the reaction between a monohydric alcohol and hydrogen sulfide. A further object of this invention is to provide a catalyst which will have a directing influence on the reaction of alcohols and hydrogen sulfide to produce increased amounts of corresponding thiols by minimizing the formation of by-products of the reaction such as sulfides, ethers, and unsaturates. Another object of this invention is to provide an efficient and effective catalytic process for the production of methanethiol, the lowest molecular weight organic thiol.

According to this invention it has been found that organic thiols may be produced from the reaction of monohydric alcohols and hydrogen sulfide, in higher yields and with increased selectivity of conversion than has been reported for processes employing prior art catalysts, by the use of improved composite catalysts consisting essentially of activated aluminum oxides whose activity is promoted by incorporating small amounts of an activity promoter selected from the group consisting of the carbonates, phosphates, halides, sulfides and sulfates of the alkali metals, namely, lithium, sodium, potassium, rubidium and cesium, in the catalyst composition.

To illustrate the instant invention, a number of catalysts were employed as contact catalysts in the reaction between methanol and hydrogen sulfide. A reaction mixture of hydrogen sulfide and methanol in a mol ratio of 2 to 1 containing about 0.33 mol percent of water was contacted with the catalyst at a temperature of about 750° F. and at 1 atmosphere pressure in a suitable reactor. Each run was conducted using a liquid volume hourly space velocity, based on methanol, of 0.38. This liquid volume hourly space velocity is defined as the liquid volume of methanol feed used per hour per unit volume of catalyst in the reactor. The various results obtained for each catalyst are summarized in Table I.

Table I

| Run | Catalyst composition | Conversion | Selectivity, percent | Mercaptan yield (mol percent) |
|---|---|---|---|---|
| 1 | $Al_2O_3$-$K_2CO_3$ (6 wt. percent) | 82.9 | 92.9 | 76.9 |
| 2 | $Al_2O_3$-$K_2CO_3$ (3 wt. percent) | 84.8 | 92.4 | 78.4 |
| 3 | $Al_2O_3$-$KCl$ (6 wt. percent) | 77.8 | 91.2 | 70.9 |
| 4 | $Al_2O_3$-$K_2SO_4$ (7 wt. percent) | 73.5 | 77.1 | 56.7 |
| 5 | $Al_2O_3$-$K_2S$ (5 wt. percent) | 73.7 | 80.8 | 59.6 |
| 6 | $Al_2O_3$-$K_3PO_4$ (6 wt. percent) | 76.3 | 93.9 | 71.6 |
| 7 | $Al_2O_3$-$K_2HPO_4$ (7 wt. percent) | 75.3 | 93.9 | 70.7 |
| 8 | $Al_2O_3$ alone | 67.5 | 68.9 | 46.1 |
| 9 | Pumice-$K_2CO_3$ (6 wt. percent) | 3.8 | 100.0 | 3.8 |

It is seen from Table I that the larger yields of methanethiol are obtained when the promoted catalysts of this invention are employed, as compared with activated alumina alone, a result made more unusual when it is seen that a pumice-supported potassium salt catalyst evinces substantially no catalytic activity. Similarly, the properties of the catalysts of this invention for selectively catalyzing the reaction to produce methanediol are illustrated by the selectivity data. This selectivity feature of the catalyst is defined as the percent of reacted methanol which was converted into methanethiol.

The following examples are illustrative of the beneficial effect attained in the preparation of the higher molecular weight thiols employing the promoted alumina catalysts of this invention:

Ethanol and hydrogen sulfide were passed over various catalysts at 600° F., employing a molal ratio of hydrogen sulfide to ethanol of 2.9. A liquid volume hourly space velocity, based on ethanol, of 0.39 was maintained. Under these conditions the following yields and selectivities for thiol formation were realized.

Table II

| Catalyst composition | Conversion, mol percent | Selectivity, percent | Mercaptan yield, mol percent |
|---|---|---|---|
| Al₂O₃ | 93.0 | 45.8 | 42.6 |
| Al₂O₃-K₂CO₃ (6 wt. percent) | 66.0 | 92.2 | 60.9 |

In another comparative test octanol-1 and hydrogen sulfide were reacted at 550° F. over an alumina catalyst. The liquid hourly space velocity, based on octanol, was 0.39 and the reactants were charged in a molal ratio of hydrogen sulfide to octanol of 7.7. Under these conditions 100% of the octanol was converted and a 34 mol percent yield of mercaptan was obtained. Thus, the selectivity was only 34 percent. Over a catalyst composed of alumina containing 6 weight percent potassium carbonate, a yield of 52 mol percent mercaptan at 54 percent selectivity resulted under the same conditions of operation.

The catalysts of this invention may be prepared by any of the techniques which are conventionally employed in catalyst manufacture. A uniform distribution of the alkali metal salt promoter throughout the alumina may be effected by permeating or impregnating alumina with a suitable salt solution or by mechanically admixing the components of the composite catalyst which have been prepared by separate precipitation. The amount of alkali metal salt promoter which may be added to the alumina to enhance its catalytic properties may be between about 0.5% by weight to 15% by weight and preferably between about 0.5% by weight to 8% by weight, although in some instances amounts outside these ranges may be desirable. In the appended claims the promoter employed is described as being contained in the alumina component of the catalyst. This means that the activity promoting reagent is incorporated in the catalyst composition by any of the conventional catalyst preparation techniques wherein an activity promoting reagent is introduced into the catalyst composition.

The activated aluminas which may be employed in a major proportion in the composite catalyst are those types of sorptive aluminum oxides which in general have surface areas in excess of around 10 square meters per gram. Activated alumina resulting from either naturally occurring materials such as bauxites or those prepared synthetically may be used. A common variety is prepared by controlled calcination of a rock-like form of alpha alumina trihydrate. This type is exemplified by Alcoa Activated Alumina Grade F. A second variety typified by Alcoa Activated Alumina Grade H is composed of translucent granules prepared from a gelatinous alumina which has a high surface area even before any decomposition of the alumina hydrate is effected. A third variety of sorptive alumina comprises discrete particles of such small size that they have appreciable areas on their outer geometric surfaces. Examples of this type are Alcoa Activated Alumina R-2396 and Alcoa Activated Alumina XF-21. The size and shape of the catalyst will be determined by how the catalyst is going to be employed. The subject invention may be carried out in a static or moving bed type of reactor employing granular or pelleted catalysts. However a fluidized system may also be used and in this instance a finely comminuted catalyst must be used.

In the use of the catalyst of the present invention for the production of thiols, the reaction between hydrogen sulfide and the alcohol employed may be carried out, as pointed out above, in either a fixed bed process or in a process in which the catalyst moves through the reaction zone. In employing the fixed bed type of reaction, temperatures on the order of 300-930° F. may be employed. Generally, optimum temperatures will be lower when higher molecular weight alcohols are employed as reactants. In the reaction of methanol and hydrogen sulfide to produce methanethiol, preferred temperatures are in the range of 575°-930° F. With higher alcohols such as octanols, preferred temperatures are in the range of 400°-750° F. Pressures may vary widely. Superatmospheric pressures up to about 200 pounds per square inch gauge are preferably used although higher pressures may be used. However, the reaction also may be carried out at subatmospheric or atmospheric pressure. The mol ratio of the reactants may range from about 0.5 to about 10 mols of hydrogen sulfide to 1 mol of alcohol. Although it is generally preferred to maintain an excess of hydrogen sulfide in the reactant mixture, it may be desirable to employ substantially stoichiometric proportions in order to avoid unnecessary complications that may occur, for example, in the recovery system. Throughput rates will vary with the temperatures and will in general be from about 0.1 to about 5 volumes of alcohol per volume of catalyst per hour. This variable also is known as the above defined liquid volume hourly space velocity.

The foregoing examples are only illustrative of the application of this invention to the preparation of thiols. Alcohols which may be used in carrying out this invention are those monohydric alcohols having from 1 to 16 carbon atoms per molecule. Such alcohols include the primary, secondary and tertiary aliphatic alcohols. Specific examples include methanol, ethanol, butanol-1, butanol-2, tert-octyl alcohol, octanol-1, dodecanol-1, dodecenyl alcohol, cetyl alcohol, etc. Mixtures of alcohols, such as "Lorol" containing alcohols of 10-16 carbon atoms, may be used also. Also applicable in the instant invention are the aryl derivatives of carbinol having not more than 16 carbon atoms per molecule, such as phenyl, benzyl, tolyl, xylyl, mono, di, and tri methyl phenyl carbinols, phenyl propyl alcohol, etc.

The recover of the organic thiols from the reaction effluent may be effected by various alternatives which may be adapted to local conditions or changing economics. One method of separation involves fractional condensation and stabilization, or, the physical principles of adsorption may be employed to recover the thiol from the reaction effluent. Several variations in recovery techniques are described in copending patent application Serial No. 431,230, filed May 20, 1954, which relates to a continuous method for the production and recovery of methanethiol produced in a manner similar to the instant invention. In the production of the higher molecular weight thiols some changes in the recovery system as determined by the nature of the products will be necessary. For example, in the preparation of the lower molecular weight thiols the reaction product upon condensation is an admixture of normally gaseous and normally liquid products. Obviously the recovery system will have to be designed to handle this heterogeneous mixture. However, the treatment of the products of the reaction between the higher molecular weight alcohols and hydrogen sulfide is somewhat simple. In this instance the products are mainly liquids with very low vapor pressure and entrainment with the residual hydrogen sulfide is the only factor of importance. Consequently, the reaction product can be processed in a stripper which removes the excess hydrogen sulfide for recycling. The product then passes on to a fractionator where the product is separated from unreacted alcohol and by-products. The crude product then is passed to a thiol fractionating unit. The thiols are withdrawn from the mercaptan tower and pass to storage. However, other processing techniques for the recovery of the thiol product from the reaction effluent will be apparent to those skilled in the art.

The catalysts which are described by this invention, in addition to producing increased yields of organic thiols by means of enhanced conversion and selectively, also have other important characteristics. These catalysts are more economical to produce, are less susceptible to attrition, have a longer life, and are less susceptible to deactivation by increased operating temperatures than the preferred thoria catalyst described in the prior art. These properties permit the catalyst to be readily employed in a fluidized operation for the production of thiols from the reaction of an alcohol and hydrogen sulfide.

It is to be understood that the foregoing examples of this invention are only illustrative. Other modifications of the manipulative technique employed in carrying out this invention will be apparent to those who are skilled in the art and are accordingly within the scope of the invention as defined in the appended claims.

We claim:

1. In the method for producing organic thiols by the reaction between hydrogen sulfide and a $C_1$–$C_{16}$ monohydric alcohol, selected from the group consisting of alkanols monocyclic aryl-substituted alkanols, and monocyclic aralkyl-substituted alkanols, at a temperature within the range of about 300–930° F., at a suitable mol ratio of hydrogen sulfide to alcohol to effect the production of said thiol as the principal product of said reaction, the improvement which comprises conducting said reaction in the presence of an activated alumina containing about 0.5 to 15% by weight of at least one activity-promoting agent selected from the group consisting of the carbonates, phosphates, halides, sulfides and sulfates of the alkali metals in an amount sufficient to enhance the catalytic activity of said alumina.

2. In the method for producing organic thiols by the reaction between hydrogen sulfide and a $C_1$–$C_{16}$ monohydric alcohol, selected from the group consisting of alkanols monocyclic aryl-substituted alkanols, and monocyclic aralkyl-substituted alkanols, at a temperature within the range of about 300–930° F., a mol ratio of hydrogen sulfide:alcohol of about 0.5–10:1, and a liquid hourly space velocity, based on alcohol, of about 0.1–5, the improvement which comprises conducting said reaction in the presence of an activated alumina containing about 0.5 to 15% by weight of at least one activity-promoting agent selected from the group consisting of the carbonates, phosphates, halides, sulfides and sulfates of the alkali metals in an amount sufficient to enhance the catalytic activity of said alumina.

3. A method in accordance with claim 2 in which the activity-promoting agent is an alkali metal carbonate.

4. A method in accordance with claim 2 in which the activity-promoting agent is an alkali metal chloride.

5. A method in accordance with claim 2 in which the activity-promoting agent is an alkali metal phosphate.

6. A method in accordance with claim 2 in which the activity-promoting agent is an alkali metal sulfide.

7. A method in accordance with claim 2 in which the activity-promoting agent is an alkali metal sulfate.

8. In the method for producing organic thiols from the reaction between hydrogen sulfide and an alkanol having 1–16 carbon atoms per molecule, at a temperature within the range of 300–930° F., a mol ratio of hydrogen sulfide:alcohol of about 0.5–10:1, and a liquid volume hourly space velocity (based on alcohol) of about 0.1–5, the improvement which comprises conducting said reaction in the presence of an activated alumina containing about 0.5% to 15% by weight, based on the catalyst composition, of an alkali metal carbonate.

9. A method in accordance with claim 8 in which the alkali metal carbonate is potassium carbonate.

10. A method for producing methanethiol by reacting hydrogen sulfide and methanol in a ratio of about 0.5 to 10 mols of hydrogen sulfide per mol of methanol at a temperature within the range of about 575–930° F., in the presence of an activated alumina catalyst containing about 0.5% to 15% by weight, based on the catalyst composition, of at least one activity-promoting agent selected from the group consisting of the carbonates, phosphates, halides, sulfides and sulfates of the alkali metals.

11. A method in accordance with claim 10 in which the activity-promoting agent is an alkali metal carbonate.

12. A method in accordance with claim 10 in which the activity-promoting agent is potassium carbonate.

References Cited in the file of this patent

UNITED STATES PATENTS

| Number | Name | Date |
|---|---|---|
| 2,116,182 | Baur | May 3, 1938 |
| 2,331,292 | Archibald et al. | Oct. 12, 1943 |
| 2,474,440 | Smith et al. | June 28, 1949 |
| 2,495,278 | Nickels | Jan. 24, 1950 |
| 2,667,515 | Beach et al. | Jan 26, 1954 |

U. S. DEPARTMENT OF COMMERCE
PATENT OFFICE

CERTIFICATE OF CORRECTION

Patent No. 2,820,061                      January 14, 1958

Hillis O. Folkins et al.

It is hereby certified that error appears in the printed specification of the above numbered patent requiring correction and that the said Letters Patent should read as corrected below.

Column 1, line 25, for "sulhydryl" read --sulfhydryl--; column 2, line 58, for "methanediol" read --methanethiol--; column 4, line 37, for "recover" read --recovery--; line 58, for "simple" read --simpler--; line 73, for "selectively" read --selectivity--; column 5, line 17, after the syllable "kanols" insert a comma; line 32, after "alkanols" insert a comma.

Signed and sealed this 25th day of March 1958.

(SEAL)
Attest:

KARL H. AXLINE

Attesting Officer

ROBERT C. WATSON
Commissioner of Patents